US011722943B2

United States Patent
Kumar et al.

(10) Patent No.: US 11,722,943 B2
(45) Date of Patent: Aug. 8, 2023

(54) METHODS AND APPARATUS FOR POSITIONING ENHANCEMENTS BASED ON CONDITIONAL RECONFIGURATION AND HANDOVER FEATURE SUPPORT

(71) Applicant: QUALCOMM Incorporated, San Diego, CA (US)

(72) Inventors: Akash Kumar, Hyderabad (IN); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/125,801

(22) Filed: Dec. 17, 2020

(65) Prior Publication Data
US 2022/0201583 A1 Jun. 23, 2022

(51) Int. Cl.
*H04W 36/32* (2009.01)
*H04W 36/00* (2009.01)
(Continued)

(52) U.S. Cl.
CPC ....... *H04W 36/32* (2013.01); *H04W 36/0058* (2018.08); *H04W 36/0072* (2013.01);
(Continued)

(58) Field of Classification Search
CPC ............. H04W 36/32; H04W 36/0058; H04W 36/0072; H04W 36/00837; H04W 36/0094; H04W 56/0045; H04W 76/11
See application file for complete search history.

(56) References Cited

U.S. PATENT DOCUMENTS

2004/0166858 A1\* 8/2004 Masuda ............ H04W 36/0061
455/442
2013/0136021 A1\* 5/2013 Pankaj .............. H04W 36/0027
370/252
(Continued)

FOREIGN PATENT DOCUMENTS

WO 2012096608 A1 7/2012
WO 2016086992 A1 6/2016
WO 2020128848 A1 6/2020

OTHER PUBLICATIONS

International Search Report and Written Opinion—PCT/US2021/056911—ISA/EPO—dated Feb. 23, 2022.

Primary Examiner — Ashley Shivers
(74) Attorney, Agent, or Firm — Thien T. Nguyen

(57) ABSTRACT

A user equipment (UE) uses conditional reconfiguration during positioning to improve the positioning performance. The UE receives conditional reconfiguration information from a serving base station, which includes a list one or more candidate target base stations and their associated resources for handover. During a positioning session, the UE receives assistance data and determines a target base station for handover based on the list of candidate target base stations and the assistance data. The UE, for example, may select a candidate target base station for handover during the positioning session to minimize the number of measurements gaps that are required for positioning measurements, or to increase bandwidth or minimize self-interference. Where timing advance measurements are requested, the UE may select a candidate target base station based on sub-carrier spacing to improve measurement resolution.

22 Claims, 8 Drawing Sheets

(51) Int. Cl.
*H04W 56/00* (2009.01)
*H04W 76/11* (2018.01)
(52) U.S. Cl.
CPC . *H04W 36/0094* (2013.01); *H04W 36/00837* (2018.08); *H04W 56/0045* (2013.01); *H04W 76/11* (2018.02)

(56) References Cited

U.S. PATENT DOCUMENTS

2014/0295884 A1* 10/2014 Racz ................... H04W 24/10
455/456.1
2016/0353299 A1* 12/2016 Sayeed ................ H04W 24/08
2021/0112475 A1* 4/2021 Kim ..................... H04W 36/36

* cited by examiner

METHODS AND APPARATUS FOR POSITIONING ENHANCEMENTS BASED ON CONDITIONAL RECONFIGURATION AND HANDOVER FEATURE SUPPORT

BACKGROUND

Field

Subject matter disclosed herein relates to position determination of a mobile device and more particularly to enhancement of the position determination process using conditional reconfiguration and handover.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may transmit a positioning reference signal (PRS). Assistance data is sent to a mobile device to assist in acquiring and measuring signals and/or in computing a location estimate from the measurements, which may be useful for acquiring PRS for location determination. A mobile device acquiring PRSs transmitted by different base stations may deliver signal-based measurements to a location server, which may be part of an Evolved Packet Core (EPC) or 5G Core Network (5GCN), for use in computing a location estimate of the mobile device. For example, a UE may generate positioning measurements from the downlink (DL) PRS such as Reference Signal Time Difference (RSTD), Reference Signal Received Power (RSRP), and reception and transmission (RX-TX) time difference measurements, which may be used in various positioning methods, such as Time Difference of Arrival (TDOA), Angle of Departure (AoD), and multi-cell Round Trip Time (RTT). Alternatively, a mobile device may compute an estimate of its own location using various positioning methods. Other position methods that may be used for a mobile device include use of a Global Navigation Satellite System (GNSS) such as GPS, GLONASS or Galileo and use of Assisted GNSS (A-GNSS) where a network provides assistance data to a mobile decide to assist the mobile device in acquiring and measuring GNSS signals and/or in computing a location estimate from the GNSS measurements.

The positioning performance of a mobile device may be impacted by various factors. For example, in some instances, the mobile device may be required to tune away from its serving base station in order to perform positioning measurements on neighboring base stations, which may impact throughput degradation and user experience. Other factors that may affect positioning performance include, e.g., self-interference on specific frequency bands, which may de-sense positioning measurements, and numerology and bandwidth of the serving base station. It is desirable to desirable to improve positioning performance by eliminating or mitigating the impact of such factors.

SUMMARY

A user equipment (UE) uses conditional reconfiguration during positioning to improve the positioning performance. The UE receives conditional reconfiguration information from a serving base station, which includes a list one or more candidate target base stations and their associated resources for handover. During a positioning session, the UE receives assistance data and determines a target base station for handover based on the list of candidate target base stations and the assistance data. The UE, for example, may select a candidate target base station for handover during the positioning session to minimize the number of measurements gaps that are required for positioning measurements, or to increase bandwidth or minimize self-interference. Where timing advance measurements are requested, the UE may select a candidate target base station based on sub-carrier spacing to improve measurement resolution.

In one implementation, a method for supporting positioning of a user equipment (UE) in a wireless network performed by the UE may include receiving from a serving base station a conditional reconfiguration information comprising a list of at least one candidate target base station and associated resources for handover; receiving assistance data for positioning measurements; determining a target base station for handover based on the list of at least one candidate target base station and the assistance data; performing handover to the target base station; and performing positioning measurements based on the assistance data.

In one implementation, a user equipment (UE) in a wireless network configured for supporting positioning of the UE, the UE includes an wireless transceiver configured to wirelessly communicate with entities in the wireless network; at least one memory; at least one processor coupled to the wireless transceiver and the at least one memory, wherein the at least one processor is configured to: receive from a serving base station, via the wireless transceiver, a conditional reconfiguration information comprising a list of at least one candidate target base station and associated resources for handover; receive, via the wireless transceiver, assistance data for positioning measurements; determine a target base station for handover based on the list of at least one candidate target base station and the assistance data; perform, via the wireless transceiver, handover to the target base station; and perform, via the wireless transceiver, positioning measurements based on the assistance data.

In one implementation, a user equipment (UE) in a wireless network configured for supporting positioning of the UE, the UE includes means for receiving from a serving base station a conditional reconfiguration information comprising a list of at least one candidate target base station and associated resources for handover; means for receiving assistance data for positioning measurements; means for determining a target base station for handover based on the list of at least one candidate target base station and the assistance data; means for performing handover to the target base station; and means for performing positioning measurements based on the assistance data.

In one implementation, a non-transitory computer readable storage medium including program code stored thereon, the program code is operable to configure at least one processor in a user equipment (UE) in a wireless network configured for supporting positioning of the UE, includes program code to receive from a serving base station a conditional reconfiguration information comprising a list of at least one candidate target base station and associated resources for handover; program code to receive assistance data for positioning measurements; program code to determine a target base station for handover based on the list of at least one candidate target base station and the assistance data; program code to perform handover to the target base station; and program code to perform positioning measurements based on the assistance data.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
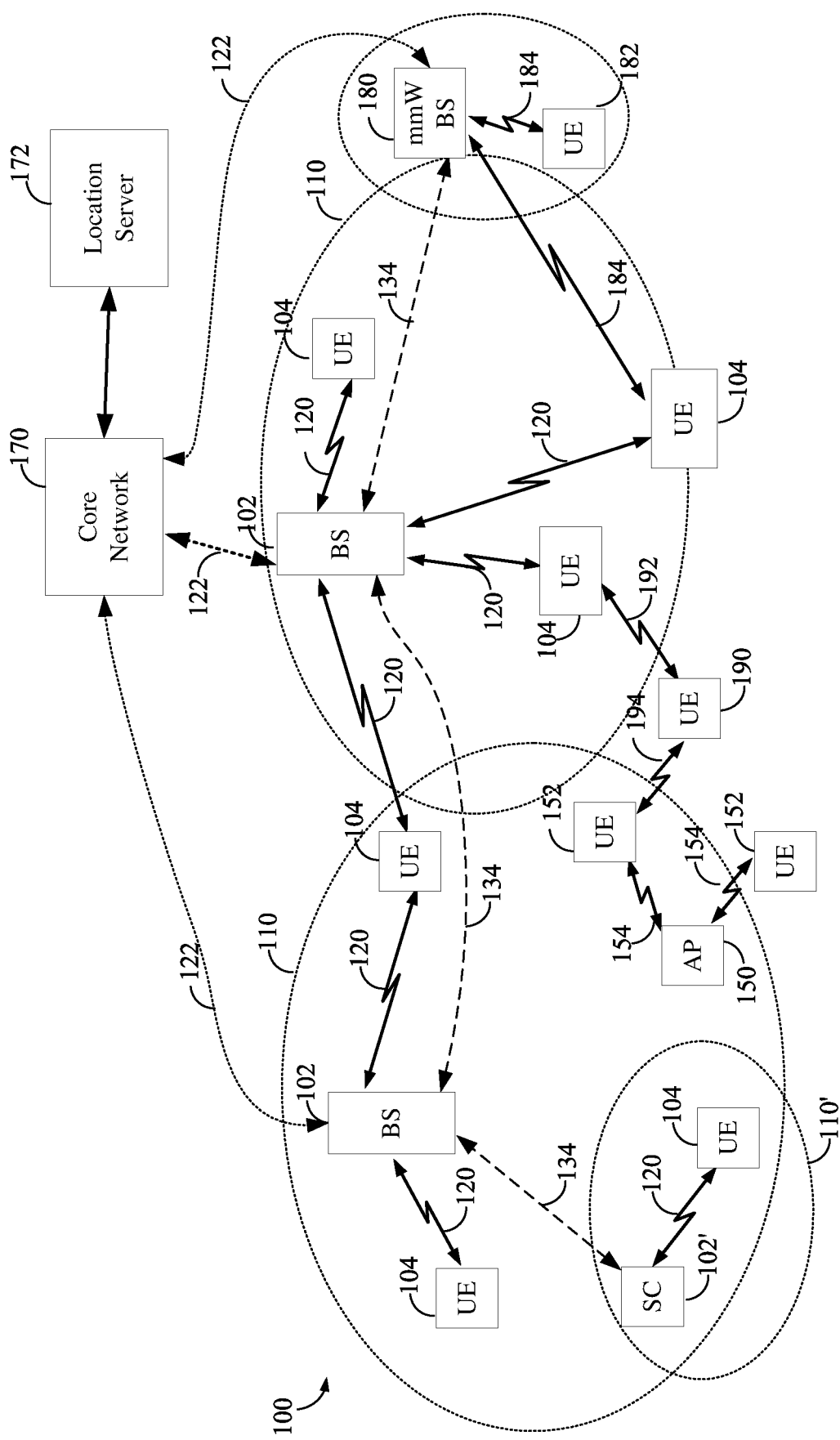
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference radio frequency (RF) signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server to support positioning. The location server may be part of or accessible from a serving network or a home network for a UE or may simply be accessible over the Internet or over a local Intranet. If positioning of a UE is needed, a location server may instigate a session (e.g., a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g. if requested by the UE or in the absence of a request) and may request a location estimate or location measurements from a UE for various positioning techniques, e.g. for the Global Navigation Satellite System (GNSS), Time Difference of Arrival (TDOA), Angle of Departure (AoD), Round Trip Time (RTT) or multi cell RTT (Multi-RTT), Enhanced Cell ID (ECID), or other position methods. Assistance data may be used by a UE to acquire and measure GNSS and/or reference signals (e.g., by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to a location server which may determine an estimated location of the UE based on these measurements and possibly based also on other known or configured data (e.g., satellite ephemeris data for GNSS location or base station characteristics including base station locations and possibly PRS timing in the case of terrestrial positioning using, e.g., TDOA, AoD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GNSS (e.g., if a UE obtains satellite orbital data from data broadcast by GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g. an eNB for LTE access or gNB for 5G NR access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the NRPPA protocol may be used to transfer such messages between a base station that is a gNodeB and a location server that is an LMF. It is noted that the terms "parameter" and "information element" (IE) are synonymous and are used interchangeably herein.

During positioning using signaling in LTE and 5G NR, a UE typically acquires a dedicated positioning signals transmitted by base stations, referred to as a Positioning Reference Signals (PRS), which are used to generate the desired measurements for the supported positioning technique. Positioning Reference Signals (PRS) are defined for 5G NR positioning to enable UEs to detect and measure more neighbor base stations or Transmission and Reception Points (TRPs). Several configurations are supported to enable a variety of deployments (indoor, outdoor, sub-6, mmW). To support PRS beam operation, beam sweeping is additionally supported for PRS. Table 1 below illustrates 3GPP release numbers (e.g., Rel.16 or Rel.15) that define particular reference signals for various UE measurements and the accompanying positioning techniques.

TABLE 1

| DL/UL Reference Signals | UE Measurements | To facilitate support of the following positioning techniques |
| --- | --- | --- |
| Rel.16 DL PRS | DL RSTD | DL-TDOA |
| Rel.16 DL PRS | DL PRS RSRP | DL-TDOA, DL-AoD, Multi-RTT |
| Rel.16 DL PRS/Rel.16 SRS for positioning | UE Rx-Tx time difference | Multi-RTT |
| Rel.15 SSB/CSI-RS for RRM | SS-RSRP (RSRP for RRM), SS-RSRQ (for RRM), CSI-RSRP (for RRM), CSI-RSRQ (for RRM), Timing Advance (TA) | E-CID |

In addition to PRS signals, a UE, however, receives many other signals that are not intended for positioning. For example, a UE receives control and communication signals, such as Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH). Additionally, a UE may receive downlink signals from base stations as well as sidelink signals from other UEs.

In order to improve mobility performance, a conditional handover has been defined, e.g., in Release 16. The conditional handover, sometimes referred to as 'Conditional Reconfig/Handover' improves mobility performance and reduces Radio Link Failure (RLF) during handover (HO) in high mobility scenarios. In a conditional handover mode, the source base station for a UE prepares multiple neighbor base stations, which reserve resources for the UE, in advance of a potential handover. The associated conditional reconfiguration information, e.g., a list of one or more candidate target base stations and associated resources is provided to the UE ahead of time, i.e., before handover is required. Whenever the UE determines that the conditions for a 'cond reconfig/handover' for one or more base stations are met, the UE can directly access one of the specified targets cells and perform the associated configuration, which reduces latency and RLF during handover procedures.

As discussed herein, the UE is provided with multiple candidate target base stations which are reserving resources for the UE as part of the conditional reconfiguration information, which provides the UE with an opportunity to switch from a current serving base station to one of the candidate target base stations during a positioning session, such as in the start of the positioning session, e.g., if there may be a positioning performance improvement. Thus, the UE may perform a handover during a positioning session based on the candidate target base station and associated resources for handover received in the conditional reconfiguration information, as well as assistance data received during the positioning session. In some implementations, for example, the UE may determine that the number of measurement gaps (e.g., tuning away from the serving base station) required for requested positioning measurements may be reduced by handing over to a candidate target base station. The UE may further handover to a target candidate base station to avoid degradation of positioning measurements due to the frequency resources associated with the base stations (e.g., due to self-interference or that de-sense positioning measurements such as satellite positioning system measurements or frequency resources to be measured). The UE may further handover to a candidate target base station based on a determination of higher throughput (e.g., determined based on bandwidth or number of MIMO layers) associated with one candidate target base station relative to other candidate target base stations. The UE may further handover to a target candidate base station based on associated sub-carrier spacing, e.g., if the positioning measurements are related to timing advance (TA).

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and to one or more location servers 172. Location server 172 is illustrated as connected to core network 170 for clarity, but it should be understood that location server 172 may be within the core network 170 or within a RAN, e.g., co-located with one or more base stations 102 (e.g., as a location server surrogate (LSS) or the like). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

If the UE 104/182 has dual connectivity (DC), the radio access node that provides the control plane connection to the core network in case of multi radio dual connectivity (MR-DC) is referred to as the master node, which may be a master eNB in EN-DC, a Master ng-eNB in NGEN-DC. A master cell group (MCG) is a group of serving cells associated with the master node, that includes the PCell and optionally one or more Scells. A secondary node is another radio access node, with no control plane connection to the core network, and that provides additional resources to the UE in case of MR-DC, which may be, e.g., an en-gNB in EN-DC or a Secondary ng-eNB (in NE-DC). A secondary cell group (SCG) is a group of serving cells associated with the secondary node, that includes the primary secondary cell (PSCell) and optionally one or more Scells. The PSCell is the cell that provides the initial access under the SCG.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
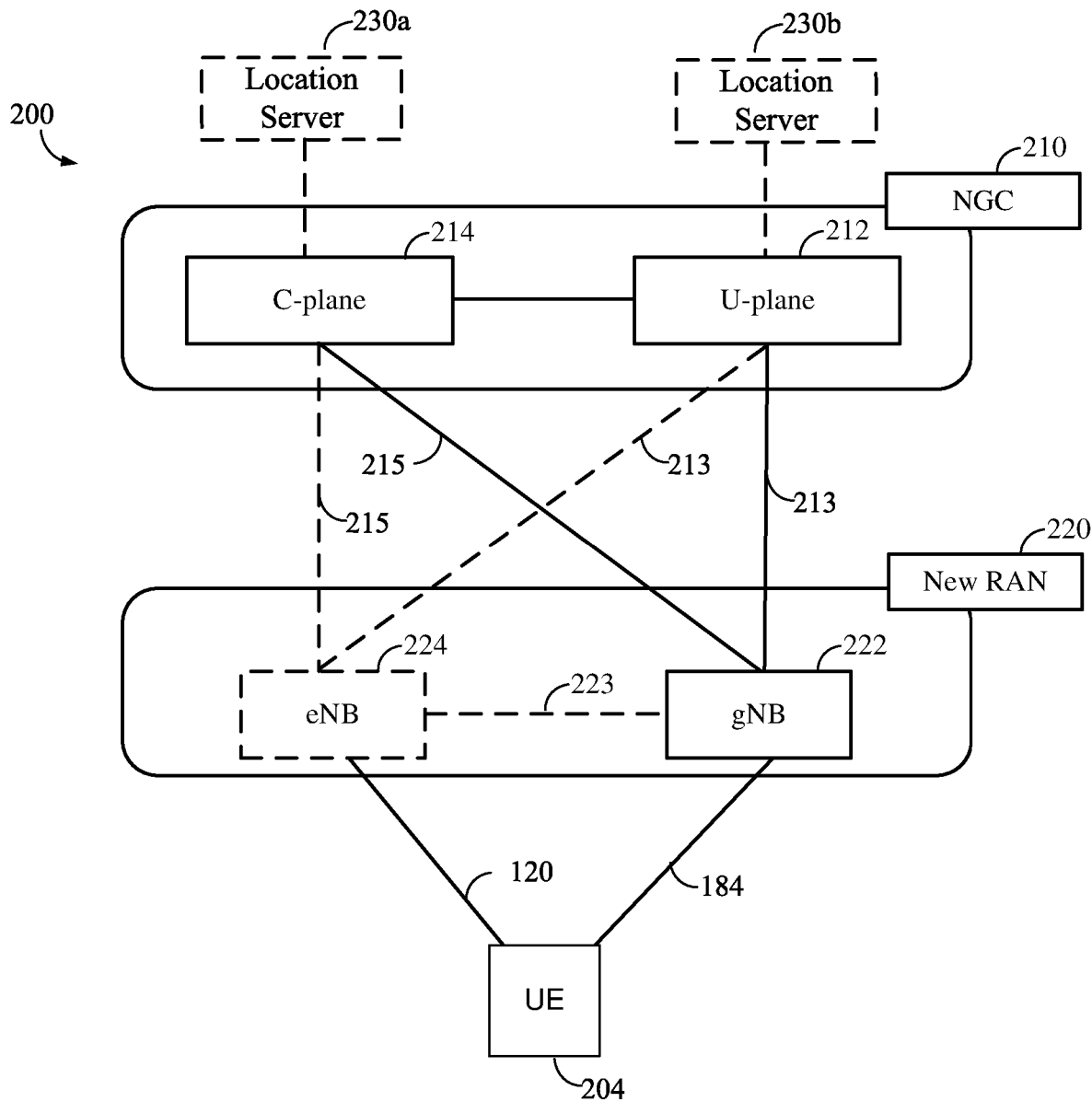
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230a, 230b (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
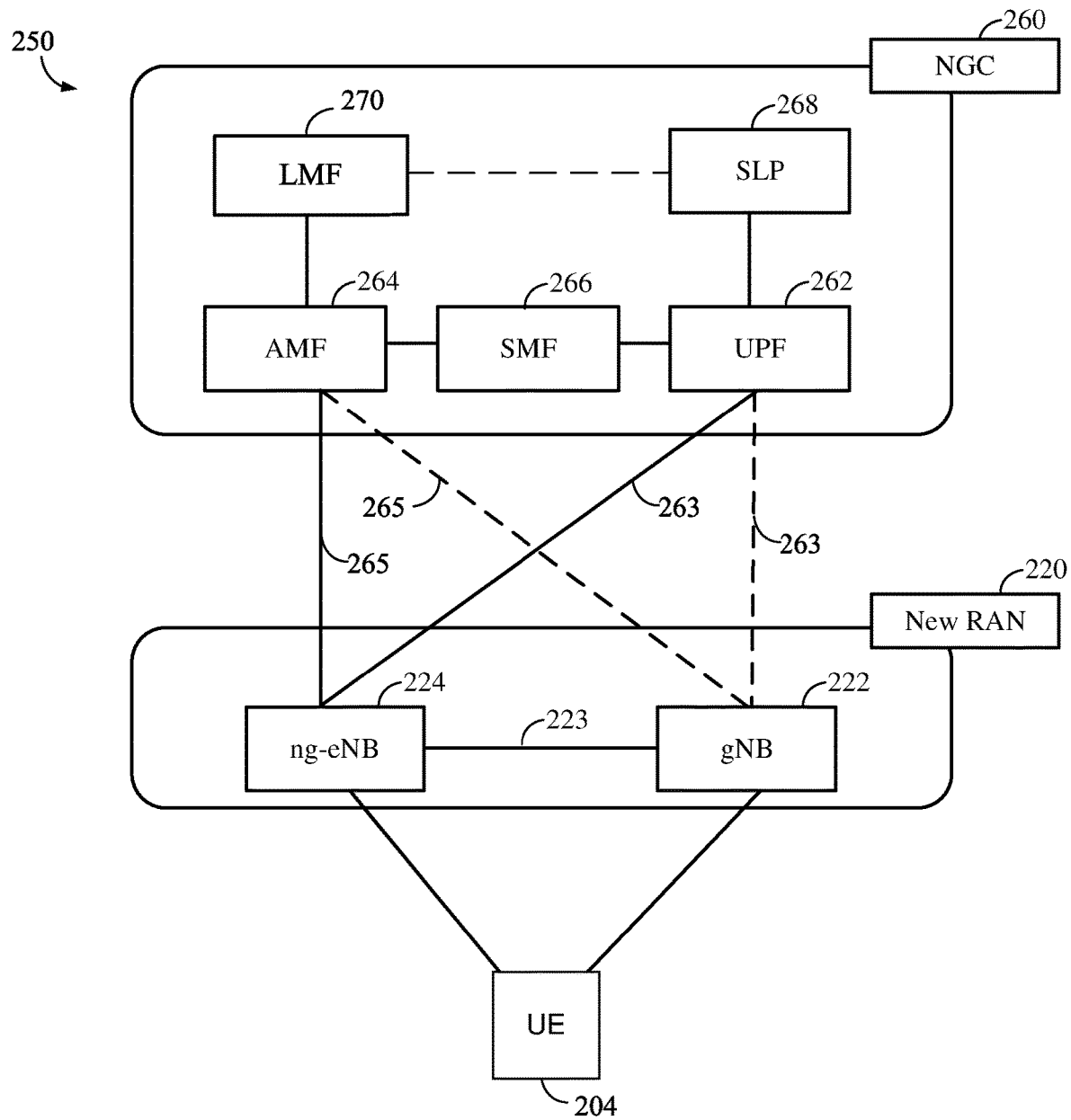

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or eNB 224 may communicate with UEs 204 (e.g., any of the UEs depicted in FIG. 1). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
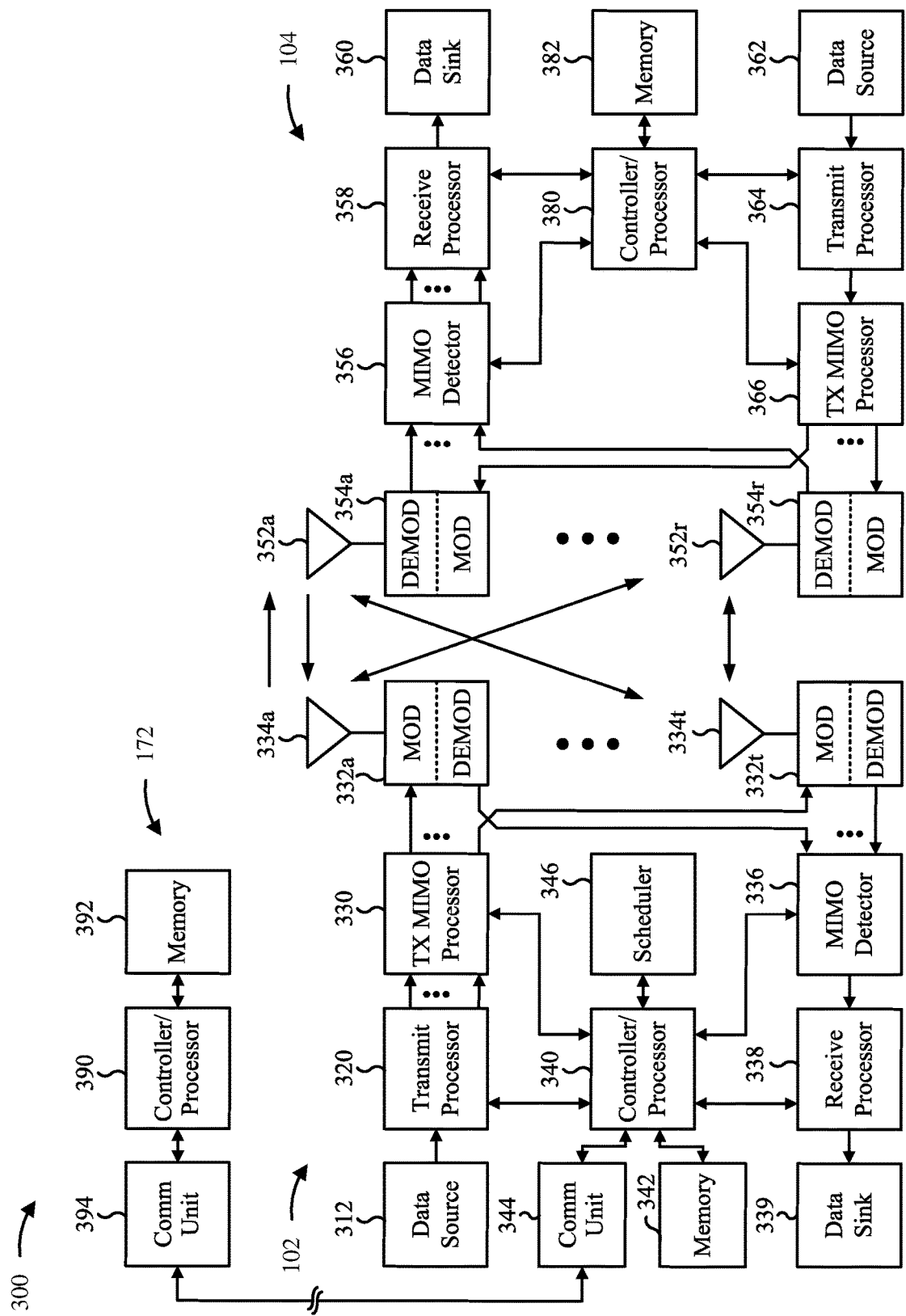
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to location server 172 via communication unit 344. In some implementations, the location server 172 may be in the RAN, e.g., co-located with the base station 102. In other implementations, the location server 172 may be within or connected to the core network, and thus, the communication unit 344 may communicate with location server 172 through various intervening entities in the core network, such as an AMF. Location server 389 may include communication unit 394, controller/processor 390, and memory 392.

Controller/processor 340 of base station 102, controller/processor 380 of UE 104, controller 390 of location server 172, and/or any other component(s) of FIG. 3 may perform one or more techniques associated broadcasting positioning assistance data in a differential manner, as described in more detail elsewhere herein. For example, controller/processor 340 of base station 102, controller 390 of location server 172, controller/processor 380 of UE 104, and/or any other component(s) of FIG. 3 may perform or direct operations of, for example, process 700 of FIG. 7, and/or other processes as described herein. Memories 342, 382, and 392 may store data and program codes for base station 102, UE 104, and location server 172, respectively. In some aspects, memory 342 and/or memory 382 and/or memory 392 may comprise a non-transitory computer-readable medium storing one or more instructions for wireless communication. For example, the one or more instructions, when executed by one or more processors of the base station 102, location server 172, and/or the UE 104, may perform or direct operations of, for example, process 700 of FIG. 7 and/or other processes as described herein. A scheduler 346 may schedule UEs for data transmission on the downlink and/or uplink.

As indicated above, FIG. 3 is provided as an example. Other examples may differ from what is described with regard to FIG. 3.

Conditional handover, sometimes referred to as 'Conditional Reconfig/Handover' in Rel. 16, has been defined to improve mobility performance and to reduce RLF during HO in high mobility scenarios. For conditional handover, the source base station 102 prepares multiple neighbor base station (which in turn reserve resources for the UE 104 ahead of a potential handover) in advance potential PSCELL change in Non-Stand Alone (NSA) mode and Handover in Stand Alone (SA) mode. As discussed herein, PSCELL change in NSA mode and Handover in SA mode are sometimes both referred to herein as handover, unless specified otherwise. The associated RRC reconfiguration information for each candidate target base station is provided to the UE 104 ahead of any potential handover. Whenever the UE 104 determines that the conditions for a 'conditional reconfig/handover' for one or more candidate target base stations are met, the UE 104 can directly access one of the candidate target base stations and perform the associated configuration (Random Access Channel (RACH) and send RRC reconfiguration complete message). The use of conditional reconfig/handover enables the handover and PSCELL change to be performed with minimal latency and hence helps reduce RLF during HO procedures in mobility scenarios.

In conditional handover, instead of preparing one target base station as in the legacy case, multiple candidate target base stations are prepared in advance in the network. The use of multiple candidate target base stations enables the handover command to be sent to the UE 104 while the radio conditions are still good, rather than when conditions start to degrade as with legacy handover procedures. With conditional handover, the UE 104 stores the handover command after it has been received, instead of applying it immediately as with legacy handover procedures. The UE 104 may apply the stored handover command when a handover condition that is configured in the UE 104 is satisfied for one of the configured candidate target base stations, and then the UE 104 executes the handover and connects to the target base station as in a normal, e.g., legacy, handover procedure.

Figure 4:
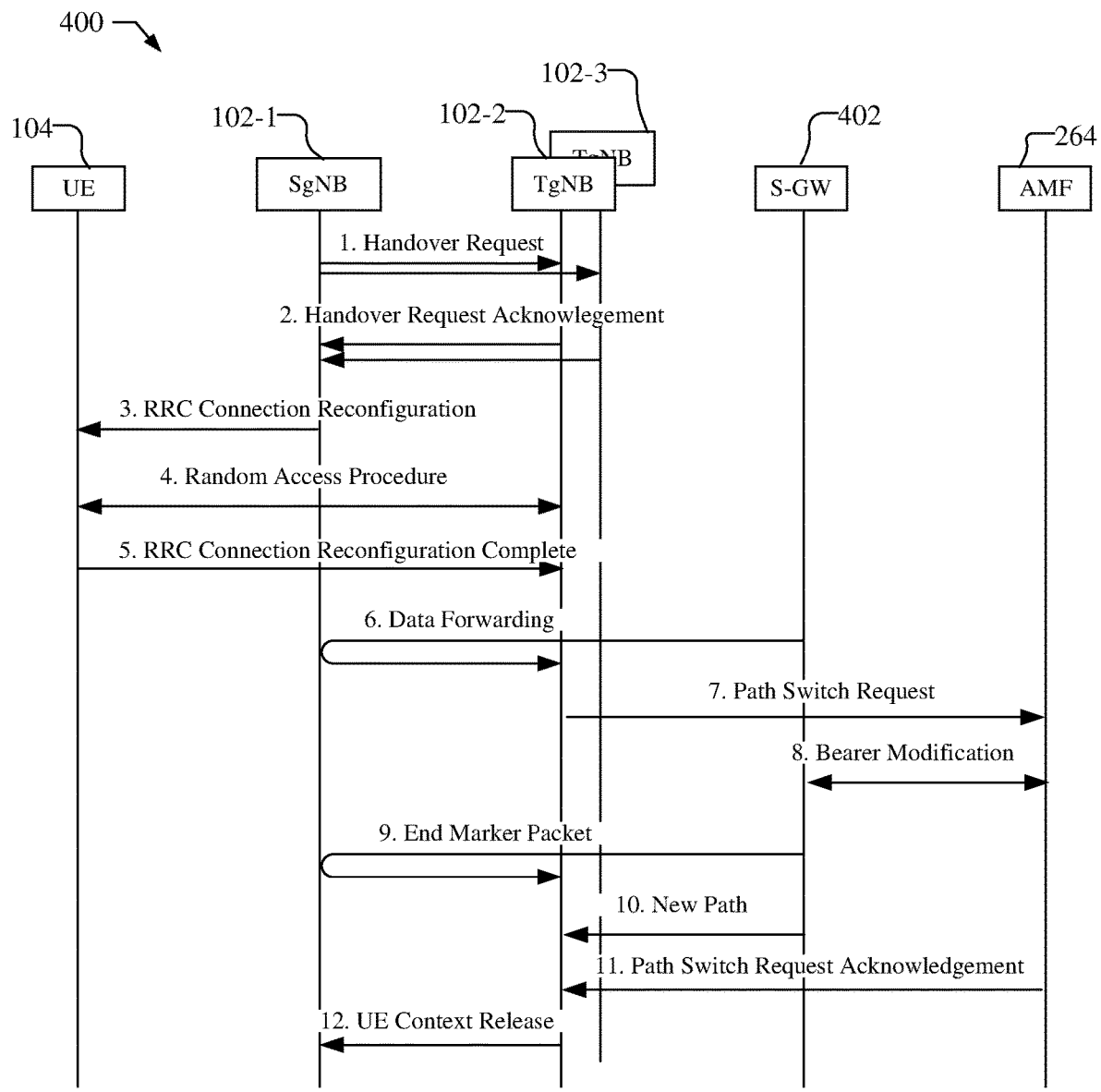
FIG. 4 is a message flow illustrating a conditional reconfiguration or handover procedure for a UE.

FIG. 4 is a message flow 400 illustrating a conditional reconfiguration or handover procedure for a UE 104 between a source gNB (SgNB) 102-1 and target gNBs (TgNBs) 102-2 and 102-3, including communications with a source gateway (S-GW) 402 and AMF 264. The conditional handover, for example, is described in 3GPP Technical Specification (TS) 38.331. The source gNB 102-1 may be the serving base station for the UE 104. It should be understood that while message flow 400 is described with gNBs 102 and AMF 264, which is applicable to 5G NR, similar procedures may be applied with other radio technologies, such as LTE with eNBs and an MME. Moreover, it should be understood that message flow 400 may include additional or fewer messages than illustrated in various implementations of conditional handover procedure.

At stage 1, the source gNB 102-1 sends a handover request to one or more candidate target base stations, e.g., target gNBs 102-2 and 102-3, to prepare the candidate target gNBs 102-2 and 102-3 for a conditional handover of the UE 104.

At stage 2, the candidate target gNBs 102-2 and 102-3 reserve resources for the UE 104 ahead of a potential handover and provide a handover request acknowledgement to the source gNB 102-1.

At stage 3, the source gNB 102-1 provides an RRC Connection Reconfiguration message, which includes a conditional reconfiguration information element (IE), to the UE 104. The conditional reconfiguration information includes a conditional reconfiguration list of the candidate target base stations, e.g., TgNBs 102-2 and 102-3, and their associated resources for conditional handover, which is stored in the UE 104. The UE 104 is further configured with reconfiguration conditions that when met triggers the UE 104 to perform the RRC reconfiguration with the associated target base station.

At stage 4, the UE 104 maintains connection with the source gNB 102-1 while evaluating the configured reconfiguration conditions. Once the configured reconfiguration conditions are met, the UE 104 is triggered to reconfigure connection to the candidate target base station 102-2, the UE 104 directly accesses the target base station 102-2 and performs the associated configuration RACH procedure.

At stage 5, the UE 104 sends an RRC connection reconfiguration complete message to the target gNB 102-2.

At stage 6, data from the source gateway 402 may be forwarded from the source gNB 102-1 320: processor to the target gNB 102-2.

At stage 7, the target gNB 102-2 may send a path switch request to the AMF 264.

At stage 8, the AMF 264 and source gateway 402 perform bearer modification.

At stage 9, an end marker packet from the source gateway 402 is forwarded from the source gNB 102-1 to the target gNB 102-2.

At stage 10, a new path is opened between the source gateway 402 and the target gNB 102-2.

At stage 11, the AMF 264 sends a path switch request acknowledgement to the target gNB 102-2.

At stage 12, the target gNB 102-2 sends a UE context release message to the source 102-1 to end the handover procedure.

The use of conditional handover, as described in FIG. 4, enables the handover from a source base station to a target base station to be performed with minimal latency and reduces RLF during the handover procedures. In addition, because the conditional reconfiguration list includes a list of one or more target base stations that are reserving resources for the UE, the UE 104 has an opportunity to quickly switch to one of the candidate target base station during a positioning session, such as in the start of the positioning session, if a positioning performance improvement through connection to one of the candidate target base stations compared to remaining with the default serving (source) base station during the positioning session.

During a positioning session, the specified assistance data for positioning may contain a list of multiple base stations and associated resources, e.g., timing and frequencies of reference signals (e.g., PRS) from the base stations, that the UE 104 is to measure and either provide to a location server (for UE assisted positioning) or to determine a position estimate (for UE based positioning) which may be provided to the location server (in some implementations along with the positioning measurements). During the positioning session, the UE 104 may be required to perform measurements using reference signals from neighboring base stations having different frequencies than used by the serving base station 102-1. Accordingly, the UE 104 may be required to request the network, i.e., the serving base station 102-1, for Measurement Gaps (MG) during which the UE 104 may tune away from the frequencies used by the serving base station 102-1 so that the UE 104 may measure the reference signals from the neighboring base stations using different frequencies. Frequent measurement gaps, however, cause throughput degradation and may impact user experience with applications running on the UE 104, e.g., applications running on the UE 104 may be adversely affected by measurement gaps used for positioning.

Accordingly, in some implementations, during a positioning session, such as in the start of the positioning session, the UE 104 may determine whether to perform a handover based on the list of candidate base stations received with the conditional reconfiguration information and the assistance data for positioning. The UE 104, for example, may check the base stations identified in the assistance data and check the candidate target base stations specified in the conditional configuration list and may determine whether positioning performance may be improved if a handover is performed and may determine the best candidate target base station from the conditional configuration list for positioning performance. For example, the UE 104 may determine which candidate target base station has a frequency of operation that includes frequencies associated with the most base stations from the assistance data. By switching to the candidate target base station that has a frequency of operation that includes more base stations than the default serving base station or other candidate target base stations, the UE 104 will need to open fewer measurement gaps during the positioning session and hence the throughput degradation during the positioning session is minimized.

Based on the one or more candidate target base stations and their associated and their associated configurations and trigger conditions that are included in the conditional reconfiguration information, the UE 104 may prioritize candidate target base station cells based on a selected criterion, such as minimizing the number of measurement gaps required during positioning, over other target base stations cells during the positioning session when multiple target base stations satisfy their associated trigger conditions. The UE 104, for example, may alter the specified trigger condition thresholds for one or more target base stations which are strongly preferred for better positioning based on a selected criterion. The UE 104 may, thus, switch to a candidate target base station during a positioning session to improve positioning performance. Once the positioning session is over, the UE 104 may switch back to the default, i.e., original serving base station.

While the number of measurement gaps required for positioning is described as one type of criterion that may be used to perform handover during the positioning session, there are multiple other considerations which may be considered to select a suitable candidate target base station from the conditional configuration list during the positioning session. For example, operating on specific frequency bands may cause self-interference in the UE 104, e.g., desensitizing GNSS or one or more of the frequencies that are required to be measured as part of assistance data measurements. Based on the knowledge of the frequency of operation of all candidate target base stations provided in the conditional reconfiguration information, the UE 104 may identify one or more candidate target base stations that would not cause any, or at least minimize, degradation to other positioning related measurements to be performed by the UE 104. The UE 104 may prioritize such candidate target base stations and may proactively switch to such a candidate target base station during the positioning session. The UE 104 may switch back to the default, i.e., original serving base station, when the positioning sessions is completed.

In another implementation, the UE 104 may use higher net throughput as a criterion for performing handover during a positioning session using the conditional reconfiguration information. For example, the UE 104 may estimate the throughput degradation expected due to positioning measurements using the current serving base station, which may be due to multiple measurement gaps during the positioning session, and if greater than a predetermined threshold may to compensate for throughput loss by selecting a candidate target base station that could offset the throughput degradation by providing higher net TP. Thus, the UE 104 may select a target base station for handover during a positioning session using the conditional reconfiguration information based on higher bandwidth. Additionally, or alternatively, the UE 104 may select a target base station for handover during a positioning session using the conditional reconfiguration information based on support of a higher number of layers or Ranks.

In another implementation, the UE 104 may use higher sub-carrier spacing (SCS) as a criterion for performing handover during a positioning session using the conditional reconfiguration information. A higher SCS is associated with increased Timing Adjustment (TA) granularity, which improves resolution for TA based positioning measurements, such as ECID, etc.

Timing advance is a Medium Access Control-Control Element (MAC-CE) that is used to control Uplink signal transmission timing. The network, e.g., the serving base station, measures the time difference between, e.g., Physical Uplink Shared Channel (PUSCH), Physical Uplink Control Channel (PUCCH), or Sounding Reference Signal (SRS) reception and the subframe time. The base station may send a timing advance command to UE 104 to change the PUSCH/PUCCH transmission to make it better aligned with the subframe timing at the network side. The difference between the time of base station receiving the PUSCH/PUCCH/SRS transmitted by the UE 104 and the subframe time is related to the range or distance between the base station and the UE 104. For example, if the UE 104 is close to the base station, the PUSCH/PUCCH/SRS may arrive too early at the base station and the timing advance command to UE indicates to delay transmission, while if the UE 104 is far from the base station, the PUSCH/PUCCH/SRS may arrive to late at the base station and the timing advance command to UE 104 indicates to transmit early.

Thus, the timing advance command operates as an indication of the distance between UE 104 and the base station, which may be used in TA related positioning measurements, such as ECID. In ECID, for example, the identity (ID) of the serving base station for the UE 104 is provided along with the current timing advance for the UE 104. The location of the serving base station may be known by a location server, and timing advance may be used to estimate the position of the UE 104 based on the distance of the UE 104 from the location of the serving base station.

The timing advance command in a MAC-CE is a 6 bit field. Thus, the range for a timing advance value is between 0 to 63, of which half of the values are used for advancing the transmission and other half for delaying the transmission. The resolution of the absolute timing advance value, accordingly, is directly proportional to the numerology of the transmission used by the UE on that carrier. The numerology is defined by sub-carrier spacing (the width of sub-carriers in the frequency domain) and by its cyclic prefix. For example, for LTE there is only one sub-carrier spacing 15 KHz. On the other hand, 5G NR supports multiple numerology for UL from 15 KHz, 30 KHz, 60 KHz and 120 KHz. Thus, the same timing advance value (e.g., between 0 and 63) will map to a lower absolute timing advance in higher numerology compared to a lower numerology, which allows for a much finer timing advance change at a higher numerology, and accordingly, a higher numerology, i.e., higher SCS, will provide a finer resolution of UE position.

In 5G NR, the UE 105 may operate in multiple modes. For example, the UE 104 may operate with 5G NSA with LTE as Anchor (or MCG) and 5G as SCG. In this mode, the 5G base station may be of any numerology (i.e., while 15 KHz, 30 KHz, 60 KHz and 120 KHz), while LTE would be always 15 KHz numerology. Another mode is 5G SA, where the UE 104 is connected to a single NR base station or multiple base stations in carrier aggregation (CA). Another mode is DC (Dual Connectivity), in which the UE may be operated in different frequency bands, e.g., FR1+FR2, where one bearer operates from FR1 and the other bearer operates from FR2.

Based on the knowledge of the frequency of operation of all candidate target base stations provided in the conditional reconfiguration information, the UE 104 may identify one or more candidate target base stations that would not cause any, or at least minimize, degradation to other positioning related measurements to be performed by the UE 104.

Based on the conditional reconfiguration information provided to the UE 104, which includes a list of one or more candidate target base stations and their associated resources, including sub-carrier spacing, and if the assistance data during a positioning session indicates that a timing advance measurement is expected, the UE 104 may check the sub-carrier spacing of each candidate target base station and prioritize candidate target base stations with higher SCS (higher numerology) over candidate target base stations (or the serving base station) with lower SCS. The UE 104, thus, may switch to a candidate target base station based on sub-carrier spacing during a positioning session using positioning based on timing advance measurements, such as ECID, etc.

In some instances, there may be multiple candidate target base stations with the same numerology. In such an instance, the UE 104 may use the frequency of updates of the timing advance value to select a candidate target base station to switch to during a positioning session. For example, the UE 104 may determine the frequency of updates using the 'TimeAlignmentTimer' value, which is the value that a network sets per cell specifying the validity of the TA value. Thus, the candidate target base station with a lower 'TimeAlignmentTimer' would have its timing advance updated more often than a candidate target base station with a higher 'TimeAlignmentTimer', and updating the timing advance more frequently will assist in improving the positioning performance.

In some implementations, the UE 104 may use both the sub-carrier spacing (numerology) and the frequency of updates of the timing advance to generate a list of candidate target base stations that are prioritized during a positioning session that uses TA measurements. Based on knowing the multiple candidate target base stations and their associated configurations and trigger conditions provided to the UE 104 in the conditional reconfiguration information, the UE 104 may prioritize candidate target base stations with this selected criterion over other cells during the positioning session when multiple cells satisfy their associated conditions. The UE 104, for example, may alter the specified trigger condition thresholds for one or more target base stations which are strongly preferred for better positioning based on sub-carrier spacing or based on sub-carrier spacing and frequency of updates of the timing advance. Once the positioning session is over, the UE 104 may switch back to the default, i.e., original serving base station.

Figure 5:
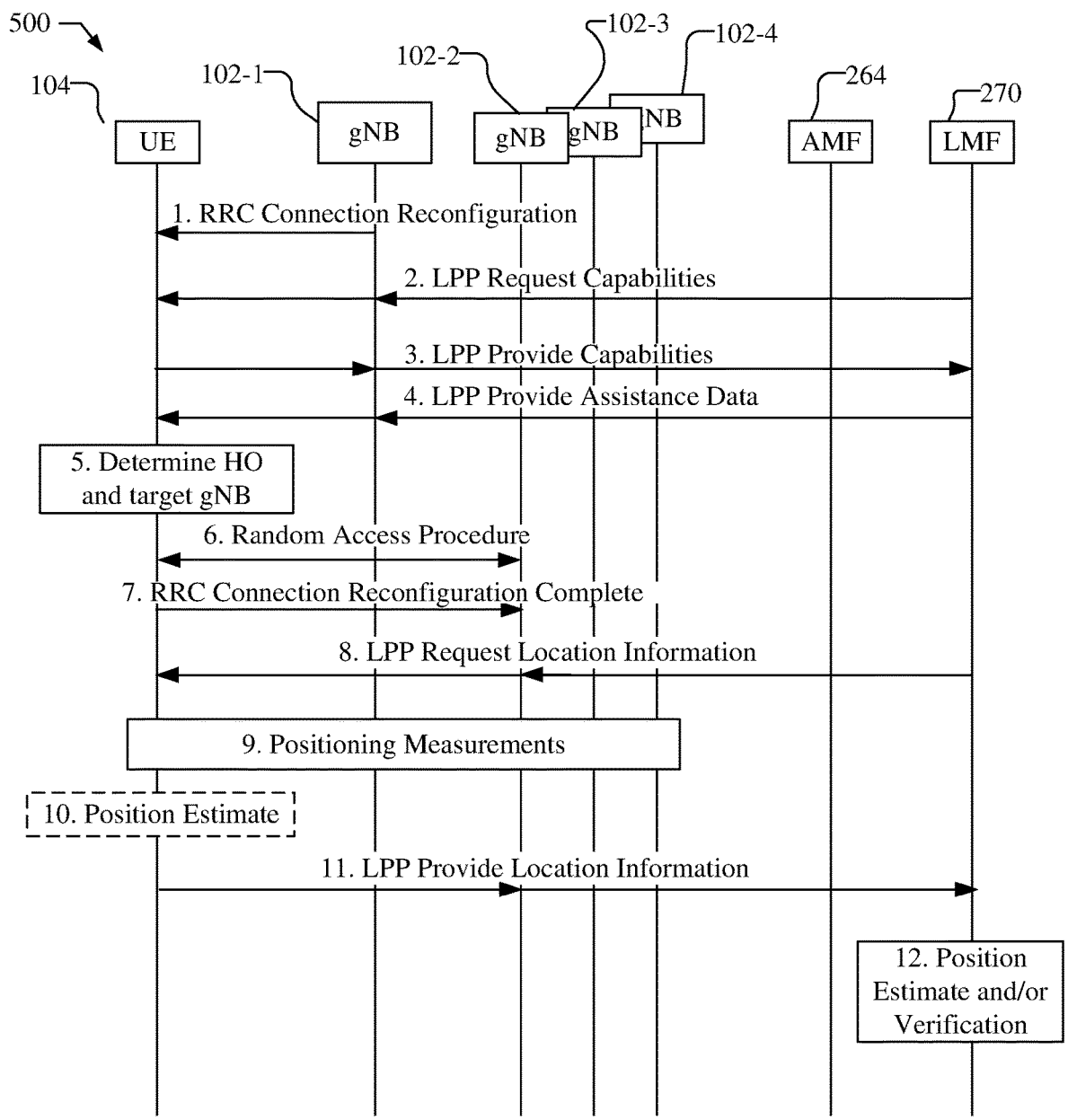
FIG. 5 is a message flow illustrating the messaging for a positioning session in which a conditional reconfiguration or handover procedure is used to improve positioning performance.

FIG. 5 is a message flow 500 illustrating the messaging between the LMF 270, AMF 264, gNBs 102, and the UE 104 for a positioning session in which a conditional reconfiguration or handover procedure is used to improve positioning performance. The source (serving) gNB 102-1 and multiple target (neighboring) gNBs 102-2, 102-3, and 102-4 may be sometimes collectively referred to as gNBs 102. The procedure illustrated in FIG. 5 may be used with DL, UL, or a combination of DL and UL positioning measurements, such as a RSTD, RSRP, Rx-Tx time difference measurements for TDOA, AoD, and Multi-RTT positioning techniques. It should be understood that while message flow 500 is described with gNBs 102, AMF 264, and LMF 270, which is applicable to 5G NR, similar procedures may be applied with other radio technologies, such as LTE with eNBs, MME, and E-SMCL or an SLP. Moreover, it should be understood that message flow 500 may include additional or fewer messages than illustrated in various implementations of a positioning procedure with conditional reconfiguration.

At stage 1, the source gNB 102-1 provides an RRC Connection Reconfiguration message to the UE 104, which includes a conditional reconfiguration IE. The conditional reconfiguration information includes a conditional reconfiguration list of the candidate target base stations, which may include, e.g., gNBs 102-2, 102-3, and 102-4, and their associated resources for conditional handover, which is stored in the UE 104. As discussed in FIG. 4, the source gNB 102-1 may previously request that each of the candidate target base stations reserve resources for the UE 104 ahead of potential handover. The UE 104 is further configured with reconfiguration conditions that when met triggers the UE 104 to perform the RRC reconfiguration with the associated target base station. The RRC Connection Reconfiguration message may be provided to UE 104 at any time before initiation of the position procedure illustrated in FIG. 5, e.g., at are shortly after the time of initial connection to the serving base station 102-1.

At stage 2, the LMF 270 may request the positioning capabilities of the UE 104 using a LPP Capability Transfer procedure via the serving base station 102-1 and various other intermediary entities, such as AMF 264.

At stage 3, the UE 104 may send an LPP Provide Capabilities message, providing the positioning capabilities of the UE 104 to the LMF 270 via the serving base station 102-1 and various other intermediary entities, such as AMF 264.

At stage 4, the LMF 270 may prepare and send a LPP Provide Assistance Data message to the UE 104 via the serving base station 102-1 and various other intermediary entities, such as AMF 264. The assistance data in the LPP Provide Assistance Data message may include a list of one or more gNBs and associated resources, and the type of positioning measurements to perform with respect to reference signals provided by the gNBs, such as DL RSTD, D1 RSRP, Rx-Tx time difference, etc., as well as satellite positioning system measurements. In some implementations, the assistance data may additionally or alternative indicate that a TA based measurement is expected for a TA based positioning method such as ECID, etc., although in some implementations, a TA based measurement may not need an explicit indication in the assistance data.

At stage 5, the UE 104 determines whether to perform a handover from the serving gNB 102-1 based on the list of candidate target gNBs 102-2, 102-3, 102-4 received in the conditional reconfiguration information at stage 1 and the assistance data received at stage 4. For example, as discussed above, the UE may determine whether to perform a handover to improve positioning performance, and if so, to which of the candidate target gNBs to switch based on criteria such as reducing the number of measurement gaps required for positioning measurements, minimizing self-interference caused by specific frequency bands, increasing throughput using higher bandwidth, supporting a higher number of layers or Ranks, or if a timing advance measurement is expected based on higher sub-carrier spacing or based on higher sub-carrier spacing and frequency of update of the timing advance. For example, the UE 104 may determine a determine a candidate target gNB that minimizes a number of measurement gaps necessary for performing positioning measurements with the one or more gNBs in the assistance data and may select the candidate target gNB based on minimizing the number of measurement gaps as the target gNB for handover. For example, the determination of which target gNB minimizes the number of measurement gaps may be based on matching frequency resources associated with the candidate target gNBs with frequency resources associated with the gNBs in the assistance data. The UE 104 may prioritize one or more candidate target gNBs for handover, e.g., based on minimizing the number of measurement gaps, or other criteria, when multiple candidate target gNBs satisfy their associated trigger conditions. For example, the UE 104 may alter the trigger condition thresholds associated with a selected candidate target gNB. In another example, the UE 104 may identify frequency resources associated with candidate target gNBs that will degrade the positioning measurements, e.g., by identifying frequency bands that cause self-interference or that cause de-sense of satellite positioning system measurements or frequency resources to be measured, and may select a candidate target gNB that will minimize degradation of the positioning measurements. In another example, the UE 104 may estimate whether throughput degradation expected due to positioning measurements using the current serving base station 102-1 is greater than a predetermined threshold and, if so may select a candidate target gNB that provides a higher net throughput relative to other candidate target gNBs, e.g., as determined based on relative bandwidths of the candidate target gNB and/or relative number of MIMO layers of the candidate target gNB. In another example, where the positioning measurements are related to timing advance (TA), such as for ECID, the UE 104 may select a candidate target gNB with a higher associated sub-carrier spacing than other candidate target gNBs. Where multiple candidate target gNBs have the same sub-carrier spacing, the UE 104 may select candidate target gNB based on the frequency of update of the timing advance.

At stages 6 and 7, when the UE 104 determines that a handover should be initiated, the UE 104 directly accesses the selected target base station 102-2 and performs the associated configuration RACH procedure and sends an RRC connection reconfiguration complete message to the target gNB 102-2, as discussed in stages 4 and 5 of FIG. 4. The remaining handover procedure may be completed, as illustrated in stages 6-12 of FIG. 4.

At stage 8, the LMF 270 sends an LPP Request Location Information message to the UE 104 via the new serving base station 102-2 and various other intermediary entities, such as AMF 264. The LPP Request Location Information message requests positioning information, e.g., positioning measurements, such as RSTD, RSRP, Rx-Tx time difference measurements or TA measurements for TDOA, AoD, and Multi-RTT, or TA based positioning techniques, such as ECID.

At stage 9, the UE 104 may perform downlink positioning measurements using DL reference signals from one or more of the gNBs 102, and may provide UL references signals for measurements to the gNBs for measurement, or may obtain a current TA value from the serving gNB 102-2.

At optional stage 10, the UE 104 may determine a position estimate based on the positioning measurements from stage 9, e.g., if a UE based positioning was requested by the LMF 270.

At stage 11, the UE 104 sends an LPP Provide Location Information message to the LMF 270, via the new serving base station 102-2 and various other intermediary entities, such as AMF 264. The Provide Location Information message may include the positioning measurements obtained by the UE 104 at stage 9 and/or the position estimate obtained at stage 10. If the gNBs 102 performed UL measurements, the gNBs 102 will likewise provide the position measurements to the LMF 270.

At stage 12, the LMF 270 may determine a position estimate for the UE 104 or verifies the position estimate if provided by the UE in stage 11, using the positioning measurements reported in stage 11, and corresponding positioning techniques.

After the positioning session has ended, the UE 104 may optionally switch back to the default, i.e., original serving gNB 110-1.

Figure 6:
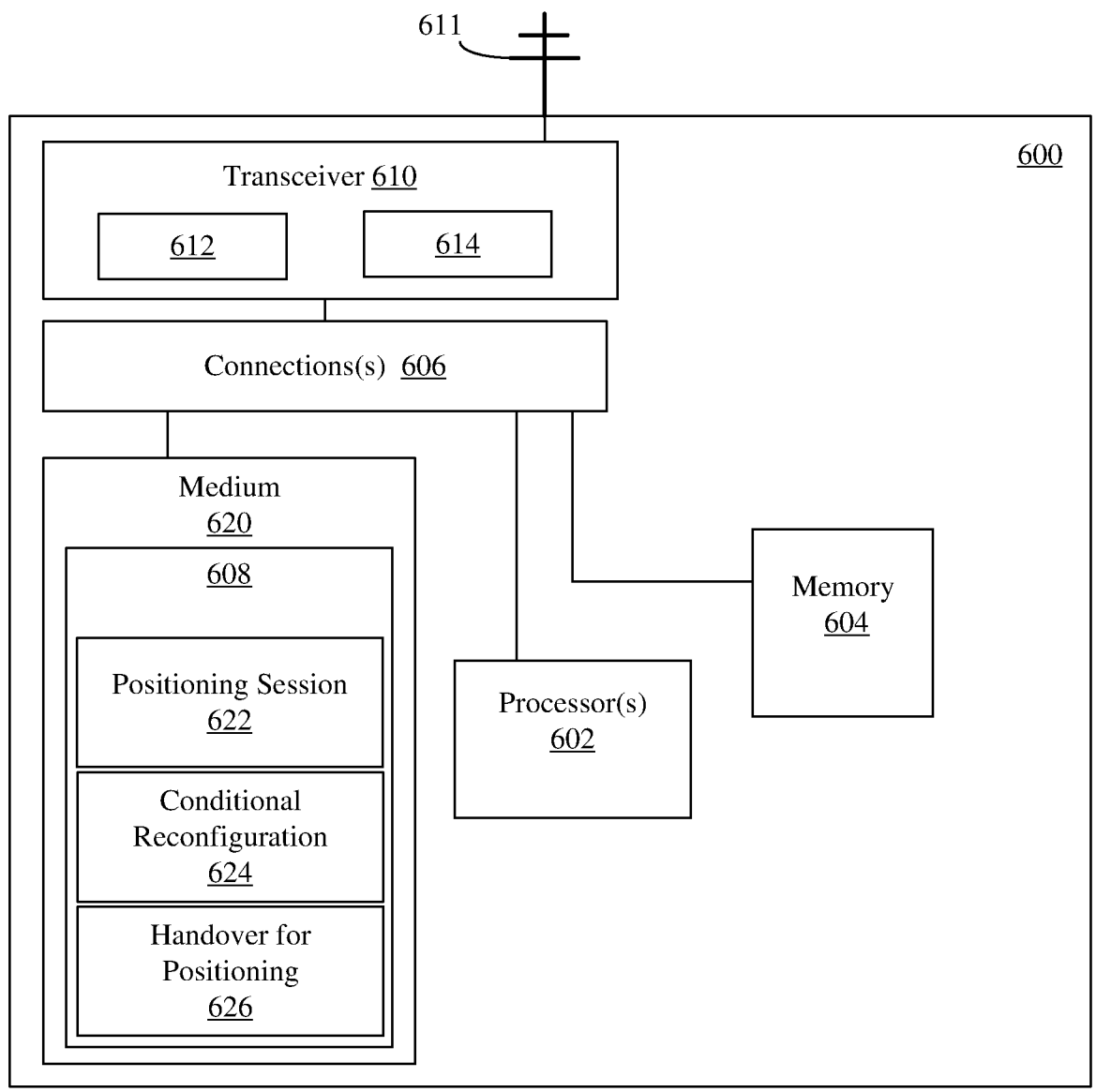
FIG. 6 shows a schematic block diagram illustrating certain exemplary features of a UE enabled to support positioning of the UE using conditional reconfiguration or handover procedure.

FIG. 6 shows a schematic block diagram illustrating certain exemplary features of a UE 600, e.g., which may be UE 104 shown in FIG. 1, enabled to support positioning of the UE using conditional reconfiguration information, as described herein. The UE 600 may perform the message flows shown in FIGS. 4 and 5 and the process flow shown in FIG. 7. UE 600 may, for example, include one or more processors 602, memory 604, an external interface such as a transceiver 610 (e.g., wireless network interface), which may be operatively coupled with one or more connections 606 (e.g., buses, lines, fibers, links, etc.) to non-transitory computer readable medium 620 and memory 604. The UE 600 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 600 may take the form of a chipset, and/or the like. Transceiver 610 may, for example, include a transmitter 612 enabled to transmit one or more signals over one or more types of wireless communication networks and a receiver 614 to receive one or more signals transmitted over the one or more types of wireless communication networks.

In some embodiments, UE 600 may include antenna 611, which may be internal or external. UE antenna 611 may be used to transmit and/or receive signals processed by transceiver 610. In some embodiments, UE antenna 611 may be coupled to transceiver 610. In some embodiments, measurements of signals received (transmitted) by UE 600 may be performed at the point of connection of the UE antenna 611 and transceiver 610. For example, the measurement point of reference for received (transmitted) RF signal measurements may be an input (output) terminal of the receiver 614 (transmitter 612) and an output (input) terminal of the UE antenna 611. In a UE 600 with multiple UE antennas 611 or antenna arrays, the antenna connector may be viewed as a virtual point representing the aggregate output (input) of multiple UE antennas. In some embodiments, UE 600 may measure received signals including signal strength and TOA measurements and the raw measurements may be processed by the one or more processors 602.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of UE 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in UE 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors. A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in UE 600 is merely exemplary, and as such the functionality of the modules and/or data structures may be combined, separated, and/or be structured in different ways depending upon the implementation of the UE 600.

The medium 620 and/or memory 604 may include a positioning session module 622 that when implemented by the one or more processors 602 configures the one or more processors 602 to engage in a positioning session for the UE. For example, the one or more processors 602 may be configured to engage in a positioning session by providing positioning capabilities to a location server, via the transceiver 610. The one or more processors 602 may be configured to receive positioning assistance data from a location server and/or serving base station, via the transceiver 610. The one or more processors 602 may be configured to perform positioning measurements, e.g., using the transceiver 610. The one or more processors 602 may further be configured to generate a position estimate based on the positioning measurements. The one or more processors 602 may provide a measurement information report, via the transceiver 610, to a location server.

The medium 620 and/or memory 604 may include a conditional reconfiguration module 624 that when implemented by the one or more processors 602 configures the one or more processors 602 for conditional reconfiguration and handover. For example, the one or more processors 602 may be configured to receive a conditional reconfiguration information from a serving base station that includes a list of candidate target base stations and associated resources for handover, e.g., including signaling configurations and reconfiguration conditions to trigger reconfiguration connection. The one or more processors 602 may be configured to store the conditional reconfiguration information, e.g., in memory 604 or other memory. The one or more processors 602 may be configured to evaluate the reconfiguration conditions for each of the candidate target base stations and when triggered to accesses the target base station and performing the associated configuration RACH procedure. The one or more processors 602 may be configured to prioritizing a selected candidate target base station, e.g., by altering trigger condition thresholds associated with the candidate target base station.

The medium 620 and/or memory 604 may include a handover for positioning module 626 that when implemented by the one or more processors 602 configures the one or more processors 602 to perform conditional reconfiguration and handover during a positioning session. For example, the one or more processors 602 may be configured to determine a target base station for handover based on the list of candidate target base station and assistance data received during the positioning session. For example, the one or more processors 602 may be configured to determine a candidate target base station that minimizes a number of measurement gaps necessary for performing positioning measurements with one or more base stations identified in the assistance data and to select that candidate target base station for handover. The one or more processors 602 may be configured, for example, to determine a candidate target base station that minimizes a number of measurement gaps by matching frequency resources associated with the candidate target base stations and the base stations identified in the assistance data. The one or more processors 602 may be configured, for example, to determine the target base station for handover by identifying frequency resources associated with candidate target base stations that will degrade the positioning measurements, e.g., by identifying frequency bands that cause self-interference or that cause de-sense of satellite positioning system measurements or frequency resources to be measured, and may select the candidate target base station that will minimize degradation of the positioning measurements. The one or more processors 602 may be configured, for example, to determine the target base station for handover by selecting a candidate target base station that provides a higher net throughput relative to other candidate target base stations, e.g., based on relative bandwidths of the candidate target base stations and/or which candidate target base stations support a higher number of MIMO layers or Ranks. The one or more processors 602 may be configured, for example, to estimate a throughput degradation expected due to positioning measurements using the serving base station and if greater than a predetermined threshold may determine the target base station for handover based on the list of at least one candidate target base station and the assistance data. The one or more processors 602 may be configured, for example, to determine the target base station for handover by selecting a candidate target base station with a higher associated subcarrier spacing than other candidate target base stations, e.g., for timing advance positioning measurements. Where multiple candidate target base stations have the same associated sub-carrier spacing, the one or more processors 602 may be configured to determine the target base station for handover by selecting a candidate target base station with a more frequent timing advance than other candidate target base stations.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program 608. For example, the non-transitory computer readable medium including program code 608 stored thereon may include program code 608 to support positioning of the UE using conditional reconfiguration or handover in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include a transceiver 610 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable code 608 stored thereon, which if executed by one or more processors 602 may be operatively enabled to perform all or portions of the example operations as described herein. Computer readable medium 620 may be a part of memory 604.

Figure 7:
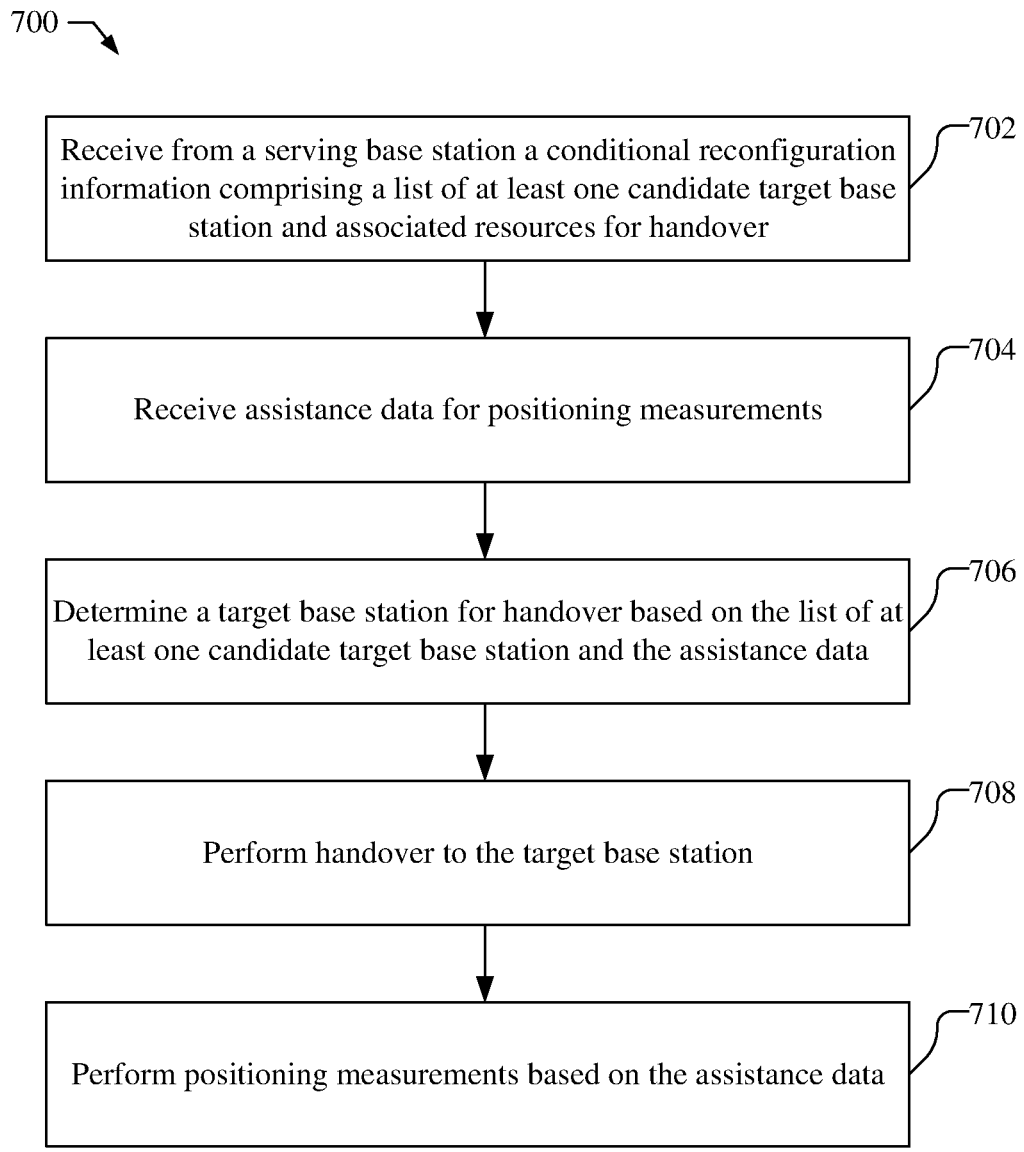
FIG. 7 shows a flowchart for an exemplary method for supporting positioning of a UE in a wireless network performed by the UE.

FIG. 7 shows a flowchart for an exemplary method 700 for supporting positioning of a user equipment (UE) in a wireless network performed by the UE, such as UE 104, in a manner consistent with disclosed implementation.

At block 702, the UE receives from a serving base station conditional reconfiguration information comprising a list of at least one candidate target base station and associated resources for handover, e.g., as discussed at stage 1 of FIG. 5. A means for receiving from a serving base station conditional reconfiguration information comprising a list of at least one candidate target base station and associated resources for handover may include the wireless transceiver 610 and one or more processors 602 with dedicated hardware or implementing executable code or software instructions in memory 604 and/or medium 620, such as the conditional reconfiguration module 624, in UE 600 shown in FIG. 6.

At block 704, the UE receives assistance data for positioning measurements, e.g., as discussed at stage 4 of FIG. 5. A means for receiving assistance data for positioning measurements may include the wireless transceiver 610 and one or more processors 602 with dedicated hardware or implementing executable code or software instructions in memory 604 and/or medium 620, such as the positioning session module 622, in UE 600 shown in FIG. 6.

At block 706, the UE determines a target base station for handover based on the list of at least one candidate target base station and the assistance data; and, e.g., as discussed at stage 5 of FIG. 5. A means for determining a target base station for handover based on the list of at least one candidate target base station and the assistance data may include the one or more processors 602 with dedicated hardware or implementing executable code or software instructions in memory 604 and/or medium 620, such as the handover for positioning module 626, in UE 600 shown in FIG. 6.

At block 708, the UE performs handover to the target base station, e.g., as discussed at stages 6 and 7 of FIG. 5. A means for performing handover to the target base station may include the wireless transceiver 610 and one or more processors 602 with dedicated hardware or implementing executable code or software instructions in memory 604 and/or medium 620, such as the conditional reconfiguration module 624, in UE 600 shown in FIG. 6.

At block 710, the UE performs positioning measurements based on the assistance data, e.g., as discussed at stage 9 of FIG. 5. A means for performing positioning measurements based on the assistance data may include the wireless transceiver 610 and one or more processors 602 with dedicated hardware or implementing executable code or software instructions in memory 604 and/or medium 620, such as the positioning session module 622, in UE 600 shown in FIG. 6.

In one implementation, the UE determines the target base station for handover based on the list of at least one candidate target base station and the assistance data by determining a candidate target base station that minimizes a number of measurement gaps necessary for performing positioning measurements with one or more base stations identified in the assistance data, and selecting the candidate target base station that minimizes the number of measurement gaps as the target base station for handover, e.g., as discussed at stage 5 of FIG. 5. For example, determining the candidate target base station that minimizes the number of measurement gaps may be based on matching frequency resources associated with the at least one candidate target base station with frequency resources associated with the one or more base stations identified in the assistance data. A means for determining a candidate target base station that minimizes a number of measurement gaps necessary for performing positioning measurements with one or more base stations identified in the assistance data may include the one or more processors 602 with dedicated hardware or implementing executable code or software instructions in memory 604 and/or medium 620, such as the handover for positioning module 626, in UE 600 shown in FIG. 6. A means for selecting the candidate target base station that minimizes the number of measurement gaps as the target base station for handover may include the one or more processors 602 with dedicated hardware or implementing executable code or software instructions in memory 604 and/or medium 620, such as the handover for positioning module 626, in UE 600 shown in FIG. 6.

In some implementations, the conditional reconfiguration information may include trigger conditions associated with the at least one candidate target base station for handover, and the UE may prioritize the candidate target base station that minimizes the number of measurement gaps over other candidate target base stations when multiple candidate target base stations satisfy their associated trigger conditions, e.g., as discussed at stage 5 of FIG. 5. A means for prioritizing the candidate target base station that minimizes the number of measurement gaps over other candidate target base stations when multiple candidate target base stations satisfy their associated trigger conditions may include the one or more processors 602 with dedicated hardware or implementing executable code or software instructions in memory 604 and/or medium 620, such as the conditional reconfiguration module 624 and the handover for positioning module 626, in UE 600 shown in FIG. 6. For example, the candidate target base station may be prioritized by the UE altering trigger condition thresholds associated with the candidate target base station that minimizes the number of measurement gaps, e.g., e.g., as discussed at stage 5 of FIG. 5. A means for altering trigger condition thresholds associated with the candidate target base station that minimizes the number of measurement gaps may include the one or more processors 602 with dedicated hardware or implementing executable code or software instructions in memory 604 and/or medium 620, such as the conditional reconfiguration module 624 and the handover for positioning module 626, in UE 600 shown in FIG. 6.

In one implementation, the UE may determine the target base station for handover based on the list of at least one candidate target base station and the assistance data by identifying frequency resources associated with candidate target base stations that will degrade the positioning measurements, and selecting a candidate target base station that will minimize degradation of the positioning measurements, e.g., as discussed at stage 5 of FIG. 5. A means for identifying frequency resources associated with candidate target base stations that will degrade the positioning measurements may include the one or more processors 602 with dedicated hardware or implementing executable code or software instructions in memory 604 and/or medium 620, such as the handover for positioning module 626, in UE 600 shown in FIG. 6. A means for selecting a candidate target base station that will minimize degradation of the positioning measurements may include the one or more processors 602 with dedicated hardware or implementing executable code or software instructions in memory 604 and/or medium 620, such as the handover for positioning module 626, in UE 600 shown in FIG. 6. For example, the UE may identify frequency resources associated with candidate target base stations that will degrade the positioning measurements by identifying frequency bands that cause self-interference or that cause de-sense of satellite positioning system measurements or frequency resources to be measured, e.g., as discussed at stage 5 of FIG. 5. A means for identifying frequency bands that cause self-interference or that cause de-sense of satellite positioning system measurements or frequency resources to be measured may include the one or more processors 602 with dedicated hardware or implementing executable code or software instructions in memory 604 and/or medium 620, such as the handover for positioning module 626, in UE 600 shown in FIG. 6.

In one implementation, the UE may determine the target base station for handover based on the list of at least one candidate target base station and the assistance data by selecting a candidate target base station that provides a higher net throughput relative to other candidate target base stations, e.g., as discussed at stage 5 of FIG. 5. For example, the UE may estimate a throughput degradation expected due to positioning measurements using the serving base station and determine is greater than a predetermined threshold and, in response, determine the target base station for handover based on the list of at least one candidate target base station and the assistance data. For example, the higher net throughput may be determined based on a bandwidth of the candidate target base station relative to other candidate target base stations or based on number of frequency layers supported by the candidate target base station relative to other candidate target base stations. A means for selecting a candidate target base station that provides a higher net throughput relative to other candidate target base stations may include the one or more processors 602 with dedicated hardware or implementing executable code or software instructions in memory 604 and/or medium 620, such as the handover for positioning module 626, in UE 600 shown in FIG. 6.

In one implementation, the positioning measurements may be related to timing advance (TA). For example, the positioning measurements related to TA may be Enhanced Cell ID positioning measurements. The UE may determine the target base station for handover based on the list of at least one candidate target base station and the assistance data by selecting a selecting a candidate target base station with a higher associated sub-carrier spacing than other candidate target base stations, e.g., as discussed at stage 5 of FIG. 5. A means for selecting a selecting a candidate target base station with a higher associated sub-carrier spacing than other candidate target base stations may include the one or more processors 602 with dedicated hardware or implementing executable code or software instructions in memory 604 and/or medium 620, such as the handover for positioning module 626, in UE 600 shown in FIG. 6. In some implementations, multiple candidate target base stations may have the higher associated sub-carrier spacing, and the UE 104 may determine the target base station for handover based on the list of at least one candidate target base station and the assistance data further by selecting a candidate target base station with a more frequent TA than other candidate target base stations, e.g., as discussed at stage 5 of FIG. 5. A means for selecting a candidate target base station with a more frequent TA than other candidate target base stations may include the one or more processors 602 with dedicated hardware or implementing executable code or software instructions in memory 604 and/or medium 620, such as the handover for positioning module 626, in UE 600 shown in FIG. 6.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method for supporting positioning of a user equipment (UE) in a wireless network performed by the UE, the method comprising:
receiving from a serving base station a conditional reconfiguration information comprising a list of at least one candidate target base station and associated resources for handover;
receiving assistance data for positioning measurements;
determining a target base station for handover based on the list of at least one candidate target base station and the assistance data;
performing handover to the target base station; and
performing positioning measurements based on the assistance data.

2. The method of clause 1, wherein determining the target base station for handover based on the list of at least one candidate target base station and the assistance data comprises:
determining a candidate target base station that minimizes a number of measurement gaps necessary for performing positioning measurements with one or more base stations identified in the assistance data; and
selecting the candidate target base station that minimizes the number of measurement gaps as the target base station for handover.

3. The method of clause 2, wherein determining the candidate target base station that minimizes the number of measurement gaps is based on matching frequency resources associated with the at least one candidate target base station with frequency resources associated with the one or more base stations identified in the assistance data.

4. The method of either of clauses 2 or 3, wherein the conditional reconfiguration information further comprises trigger conditions associated with the at least one candidate target base station for handover, the method further comprising:
prioritizing the candidate target base station that minimizes the number of measurement gaps over other candidate target base stations when multiple candidate target base stations satisfy their associated trigger conditions.

5. The method of clause 4, wherein prioritizing the candidate target base station comprises altering trigger condition thresholds associated with the candidate target base station that minimizes the number of measurement gaps.

6. The method of any of clauses 1-5, wherein determining the target base station for handover based on the list of at least one candidate target base station and the assistance data comprises:
identifying frequency resources associated with candidate target base stations that will degrade the positioning measurements; and
selecting a candidate target base station that will minimize degradation of the positioning measurements.

7. The method of clause 6, wherein identifying frequency resources associated with candidate target base stations that will degrade the positioning measurements comprises identifying frequency bands that cause self-interference or that cause de-sense of satellite positioning system measurements or frequency resources to be measured.

8. The method of any of clauses 1-7, wherein determining the target base station for handover based on the list of at least one candidate target base station and the assistance data comprises selecting a candidate target base station that provides a higher net throughput relative to other candidate target base stations.

9. The method of clause 8, further comprising estimating a throughput degradation due to positioning measurements using the serving base station and determining the target base station for handover based on the list of at least one candidate target base station and the assistance data if the throughput degradation is greater than a predetermined threshold.

10. The method of either of clauses 8 or 9, wherein the higher net throughput is determined based on a bandwidth of the candidate target base station relative to other candidate target base stations.

11. The method of any of clauses 8-10, wherein the higher net throughput is determined based on a number of Multiple Input Multiple Output (MIMO) layers of the candidate target base station relative to other candidate target base stations.

12. The method of clause 1, wherein the positioning measurements are related to timing advance (TA), and wherein determining the target base station for handover based on the list of at least one candidate target base station and the assistance data comprises selecting a candidate target base station with a higher associated sub-carrier spacing than other candidate target base stations.

13. The method of clause 12, wherein the positioning measurements related to TA are Enhanced Cell ID positioning measurements.

14. The method of either of clauses 12 or 13, wherein multiple candidate target base stations have the higher associated sub-carrier spacing, and wherein determining the target base station for handover based on the list of at least one candidate target base station and the assistance data further comprises selecting the candidate target base station with a more frequent TA than other candidate target base stations.

15. A user equipment (UE) in a wireless network configured for supporting positioning of the UE, the UE comprising:
an wireless transceiver configured to wirelessly communicate with entities in the wireless network;
at least one memory;
at least one processor coupled to the wireless transceiver and the at least one memory, wherein the at least one processor is configured to:
receive from a serving base station, via the wireless transceiver, a conditional reconfiguration information comprising a list of at least one candidate target base station and associated resources for handover;
receive, via the wireless transceiver, assistance data for positioning measurements;

determine a target base station for handover based on the list of at least one candidate target base station and the assistance data;

perform, via the wireless transceiver, handover to the target base station; and perform, via the wireless transceiver, positioning measurements based on the assistance data.

16. The UE of clause 15, wherein the at least one processor is configured to determine the target base station for handover based on the list of at least one candidate target base station and the assistance data by being configured to:

determine a candidate target base station that minimizes a number of measurement gaps necessary for performing positioning measurements with one or more base stations identified in the assistance data; and select the candidate target base station that minimizes the number of measurement gaps as the target base station for handover.

17. The UE of clause 16, wherein the at least one processor is configured to determine the candidate target base station that minimizes the number of measurement gaps by being configured to match frequency resources associated with the at least one candidate target base station with frequency resources associated with the one or more base stations identified in the assistance data.

18. The UE of either of clauses 16 or 17, wherein the conditional reconfiguration information further comprises trigger conditions associated with the at least one candidate target base station for handover, the at least one processor is further configured to:

prioritize the candidate target base station that minimizes the number of measurement gaps over other candidate target base stations when multiple candidate target base stations satisfy their associated trigger conditions.

19. The UE of clause 18, wherein the at least one processor is configured to prioritize the candidate target base station by being configured to alter trigger condition thresholds associated with the candidate target base station that minimizes the number of measurement gaps.

20. The UE of any of clauses 15-19, wherein the at least one processor is configured to determine the target base station for handover based on the list of at least one candidate target base station and the assistance data by being configured to:

identify frequency resources associated with candidate target base stations that will degrade the positioning measurements; and select a candidate target base station that will minimize degradation of the positioning measurements.

21. The UE of clause 20, wherein the at least one processor is configured to identify frequency resources associated with candidate target base stations that will degrade the positioning measurements by being configured to identify frequency bands that cause self-interference or that cause de-sense of satellite positioning system measurements or frequency resources to be measured.

22. The UE of any of clauses 15-21, wherein the at least one processor is configured to determine the target base station for handover based on the list of at least one candidate target base station and the assistance data by being configured to select a candidate target base station that provides a higher net throughput relative to other candidate target base stations.

23. The UE of clause 22, wherein the at least one processor is further configured to estimate a throughput degradation due to positioning measurements using the serving base station and to determine the target base station for handover based on the list of at least one candidate target base station and the assistance data if the throughput degradation is greater than a predetermined threshold.

24. The UE of either clauses 22 or 23, wherein the higher net throughput is determined based on a bandwidth of the candidate target base station relative to other candidate target base stations.

25. The UE of any of clauses 22-24, wherein the higher net throughput is determined based on a number of Multiple Input Multiple Output (MIMO) layers of the candidate target base station relative to other candidate target base stations.

26. The UE of clause 15, wherein the positioning measurements are related to timing advance (TA), and wherein the at least one processor is configured to determine the target base station for handover based on the list of at least one candidate target base station and the assistance data by being configured to select the candidate target base station with a higher associated sub-carrier spacing than other candidate target base stations.

27. The UE of clause 26, wherein the positioning measurements related to TA are Enhanced Cell ID positioning measurements.

28. The UE of either of clauses 26 or 27, wherein multiple candidate target base stations have the higher associated sub-carrier spacing, and wherein the at least one processor is configured to determine the target base station for handover based on the list of at least one candidate target base station and the assistance data by being configured to select a candidate target base station with a more frequent TA than other candidate target base stations.

29. A user equipment (UE) in a wireless network configured for supporting positioning of the UE, the UE comprising:

means for receiving from a serving base station a conditional reconfiguration information comprising a list of at least one candidate target base station and associated resources for handover;

means for receiving assistance data for positioning measurements;

means for determining a target base station for handover based on the list of at least one candidate target base station and the assistance data;

means for performing handover to the target base station; and means for performing positioning measurements based on the assistance data.

30. The UE of clause 29, wherein the means for determining the target base station for handover based on the list of at least one candidate target base station and the assistance data comprises:

means for determining a candidate target base station that minimizes a number of measurement gaps necessary for performing positioning measurements with one or more base stations identified in the assistance data; and means for selecting the candidate target base station that minimizes the number of measurement gaps as the target base station for handover.

31. The UE of clause 30, wherein the means for determining the candidate target base station that minimizes the number of measurement gaps comprises means for matching frequency resources associated with the at least one candidate target base station with frequency resources associated with the one or more base stations identified in the assistance data.

32. The UE of either of clauses 30 or 31, wherein the conditional reconfiguration information further comprises trigger conditions associated with the at least one candidate target base station for handover, the UE further comprising:

means for prioritizing the candidate target base station that minimizes the number of measurement gaps over other candidate target base stations when multiple candidate target base stations satisfy their associated trigger conditions.

33. The UE of clause 32, wherein the means for prioritizing the candidate target base station comprises means for altering trigger condition thresholds associated with the candidate target base station that minimizes the number of measurement gaps.

34. The UE of clause 29, wherein the means for determining the target base station for handover based on the list of at least one candidate target base station and the assistance data comprises:

means for identifying frequency resources associated with candidate target base stations that will degrade the positioning measurements; and means for selecting a candidate target base station that will minimize degradation of the positioning measurements.

35. The UE of clause 34, wherein the means for identifying frequency resources associated with candidate target base stations that will degrade the positioning measurements comprises means for identifying frequency bands that cause self-interference or that cause de-sense of satellite positioning system measurements or frequency resources to be measured.

36. The UE of any of clauses 29-35, wherein the means for determining the target base station for handover based on the list of at least one candidate target base station and the assistance data comprises means for selecting a candidate target base station that provides a higher net throughput relative to other candidate target base stations.

37. The UE of clause 36, further comprising means for estimating a throughput degradation due to positioning measurements using the serving base station, wherein the target base station for handover is determined based on the list of at least one candidate target base station and the assistance data if the throughput degradation is greater than a predetermined threshold.

38. The UE of either of clauses 36 or 37, wherein the higher net throughput is determined based on a bandwidth of the candidate target base station relative to other candidate target base stations.

39. The UE of any of clauses 36-38, wherein the higher net throughput is determined based on a number of Multiple Input Multiple Output (MIMO) layers of the candidate target base station relative to other candidate target base stations.

40. The UE of clause 29, wherein the positioning measurements are related to timing advance (TA), and wherein the means for determining the target base station for handover based on the list of at least one candidate target base station and the assistance data comprises means for selecting a candidate target base station with a higher associated sub-carrier spacing than other candidate target base stations.

41. The UE of clause 40, wherein the positioning measurements related to TA are Enhanced Cell ID positioning measurements.

42. The UE of either of clauses 40 or 41, wherein multiple candidate target base stations have the higher associated sub-carrier spacing, and wherein the means for determining the target base station for handover based on the list of at least one candidate target base station and the assistance data further comprises means for selecting the candidate target base station with a more frequent TA than other candidate target base stations.

43. A non-transitory computer readable storage medium including program code stored thereon, the program code is operable to configure at least one processor in a user equipment (UE) in a wireless network configured for supporting positioning of the UE, comprising:

program code to receive from a serving base station a conditional reconfiguration information comprising a list of at least one candidate target base station and associated resources for handover;

program code to receive assistance data for positioning measurements;

program code to determine a target base station for handover based on the list of at least one candidate target base station and the assistance data;

program code to perform handover to the target base station; and program code to perform positioning measurements based on the assistance data.

44. The non-transitory computer readable storage medium of clause 43, wherein the program code to determine the target base station for handover based on the list of at least one candidate target base station and the assistance data comprises:

program code to determine a candidate target base station that minimizes a number of measurement gaps necessary for performing positioning measurements with one or more base stations identified in the assistance data; and program code to select the candidate target base station that minimizes the number of measurement gaps as the target base station for handover.

45. The non-transitory computer readable storage medium of clause 44, wherein the program code to determine the candidate target base station that minimizes the number of measurement gaps comprises program code to match frequency resources associated with the at least one candidate target base station with frequency resources associated with the one or more base stations identified in the assistance data.

46. The non-transitory computer readable storage medium of either of clauses 44 or 45, wherein the conditional reconfiguration information further comprises trigger conditions associated with the at least one candidate target base station for handover, the non-transitory computer readable storage medium further comprising:

program code to prioritize the candidate target base station that minimizes the number of measurement gaps over other candidate target base stations when multiple candidate target base stations satisfy their associated trigger conditions.

47. The non-transitory computer readable storage medium of clause 46, wherein the program code to prioritize the candidate target base station comprises program code to alter trigger condition thresholds associated with the candidate target base station that minimizes the number of measurement gaps.

48. The non-transitory computer readable storage medium of any of clauses 43-47, wherein the program code to determine the target base station for handover based on the list of at least one candidate target base station and the assistance data comprises:

program code to identify frequency resources associated with candidate target base stations that will degrade the positioning measurements; and program code to select a candidate target base station that will minimize degradation of the positioning measurements.

49. The non-transitory computer readable storage medium of clause 48, wherein the program code to identify frequency resources associated with candidate target base stations that will degrade the positioning measurements comprises program code to identify frequency bands that cause self-interference or that cause de-sense of satellite positioning system measurements or frequency resources to be measured.

50. The non-transitory computer readable storage medium of any of clauses 43-49, wherein the program code to determine the target base station for handover based on the list of at least one candidate target base station and the assistance data comprises program code to select a candidate target base station that provides a higher net throughput relative to other candidate target base stations.

51. The non-transitory computer readable storage medium of clause 50, further comprising program code to estimate a throughput degradation due to positioning measurements using the serving base station and to determine the target base station for handover based on the list of at least one candidate target base station and the assistance data if the throughput degradation is greater than a predetermined threshold.

52. The non-transitory computer readable storage medium of clause 51, wherein the higher net throughput is determined based on a bandwidth of the candidate target base station relative to other candidate target base stations.

53. The non-transitory computer readable storage medium of either of clauses 51 or 52, wherein the higher net throughput is determined based on a number of Multiple Input Multiple Output (MIMO) layers of the candidate target base station relative to other candidate target base stations.

54. The non-transitory computer readable storage medium of clause 43, wherein the positioning measurements are related to timing advance (TA), and wherein the program code to determine the target base station for handover based on the list of at least one candidate target base station and the assistance data comprises program code to select a candidate target base station with a higher associated sub-carrier spacing than other candidate target base stations.

55. The non-transitory computer readable storage medium of clause 54, wherein the positioning measurements related to TA are Enhanced Cell ID positioning measurements.

56. The non-transitory computer readable storage medium of either of clauses 54 or 55, wherein multiple candidate target base stations have the higher associated sub-carrier spacing, and wherein the program code to determine the target base station for handover based on the list of at least one candidate target base station and the assistance data further comprises program code to select the candidate target base station with a more frequent TA than other candidate target base stations.

Therefore, it is intended that claimed subject matter not be limited to the particular examples disclosed, but that such claimed subject matter may also include all aspects falling within the scope of appended claims, and equivalents thereof.

What is claimed is:

1. A method for supporting positioning of a user equipment (UE) in a wireless network performed by the UE, the method comprising:
receiving from a serving base station a conditional reconfiguration information comprising a list of at least one candidate target base station and associated resources for handover;
receiving assistance data for positioning measurements;
determining a candidate target base station that minimizes a number of measurement gaps necessary for performing the positioning measurements with one or more base stations identified in the assistance data;
selecting the candidate target base station that minimizes the number of measurement gaps as a target base station for the handover;
performing the handover to the target base station; and
performing the positioning measurements based on the assistance data.

2. The method of claim 1, wherein determining the candidate target base station that minimizes the number of measurement gaps is based on matching frequency resources associated with the at least one candidate target base station with frequency resources associated with the one or more base stations identified in the assistance data.

3. The method of claim 1, wherein the conditional reconfiguration information further comprises trigger conditions associated with the at least one candidate target base station for the handover, the method further comprising:
prioritizing the candidate target base station that minimizes the number of measurement gaps over other candidate target base stations when multiple candidate target base stations satisfy their associated trigger conditions.

4. The method of claim 3, wherein prioritizing the candidate target base station comprises altering trigger condition thresholds associated with the candidate target base station that minimizes the number of measurement gaps.

5. A method for supporting positioning of a user equipment (UE) in a wireless network performed by the UE, the method comprising:
receiving from a serving base station a conditional reconfiguration information comprising a list of at least one candidate target base station and associated resources for handover;
receiving assistance data for positioning measurements;
identifying frequency resources associated with candidate target base stations that will degrade the positioning measurements, wherein identifying the frequency resources associated with the candidate target base stations that will degrade the positioning measurements comprises identifying frequency bands that cause self-interference or that cause de-sense of satellite positioning system measurements or the frequency resources to be measured;
selecting a candidate target base station that will minimize degradation of the positioning measurements as a target base station for the handover;
performing the handover to the target base station; and
performing the positioning measurements based on the assistance data.

6. A method for supporting positioning of a user equipment (UE) in a wireless network performed by the UE, the method comprising:
receiving from a serving base station a conditional reconfiguration information comprising a list of at least one candidate target base station and associated resources for handover;
receiving assistance data for positioning measurements;
estimating a throughput degradation due to the positioning measurements using the serving base station;
determining a target base station for the handover if the throughput degradation is greater than a predetermined threshold by selecting a candidate target base station that provides a higher net throughput relative to other candidate target base stations;
performing the handover to the target base station; and performing the positioning measurements based on the assistance data.

7. The method of claim 6, wherein the higher net throughput is determined based on a bandwidth of the candidate target base station relative to the other candidate target base stations.

8. The method of claim 6, wherein the higher net throughput is determined based on a number of Multiple Input Multiple Output (MIMO) layers of the candidate target base station relative to the other candidate target base stations.

9. A method for supporting positioning of a user equipment (UE) in a wireless network performed by the UE, the method comprising:
receiving from a serving base station a conditional reconfiguration information comprising a list of at least one candidate target base station and associated resources for handover;
receiving assistance data for positioning measurements, wherein the positioning measurements are related to timing advance (TA);
selecting a candidate target base station with a higher associated sub-carrier spacing than other candidate target base stations as a target base station for the handover;
performing the handover to the target base station; and
performing the positioning measurements based on the assistance data.

10. The method of claim 9, wherein the positioning measurements related to the TA correspond to Enhanced Cell ID positioning measurements.

11. The method of claim 9, wherein multiple candidate target base stations have the higher associated sub-carrier spacing, and wherein selecting the candidate target base station with the higher associated sub-carrier spacing than the other candidate target base stations further comprises selecting the candidate target base station with a more frequent TA than the other candidate target base stations.

12. A user equipment (UE) in a wireless network configured for supporting positioning of the UE, the UE comprising:
a wireless transceiver configured to wirelessly communicate with entities in the wireless network;
at least one memory;
at least one processor coupled to the wireless transceiver and the at least one memory, wherein the at least one processor is configured to:
receive from a serving base station, via the wireless transceiver, a conditional reconfiguration information comprising a list of at least one candidate target base station and associated resources for handover;
receive, via the wireless transceiver, assistance data for positioning measurements;
determine a candidate target base station that minimizes a number of measurement gaps necessary for performing the positioning measurements with one or more base stations identified in the assistance data;
select the candidate target base station that minimizes the number of measurement gaps as a target base station for the handover;
perform, via the wireless transceiver, the handover to the target base station; and
perform, via the wireless transceiver, the positioning measurements based on the assistance data.

13. The UE of claim 12, wherein the at least one processor is configured to determine the candidate target base station that minimizes the number of measurement gaps by being configured to match frequency resources associated with the at least one candidate target base station with frequency resources associated with one or more base stations identified in the assistance data.

14. The UE of claim 12, wherein the conditional reconfiguration information further comprises trigger conditions associated with the at least one candidate target base station for the handover, the at least one processor is further configured to:
prioritize the candidate target base station that minimizes the number of measurement gaps over other candidate target base stations when multiple candidate target base stations satisfy their associated trigger conditions.

15. The UE of claim 14, wherein the at least one processor is configured to prioritize the candidate target base station by being configured to alter trigger condition thresholds associated with the candidate target base station that minimizes the number of measurement gaps.

16. A user equipment (UE) in a wireless network configured for supporting positioning of the UE, the UE comprising:
a wireless transceiver configured to wirelessly communicate with entities in the wireless network;
at least one memory;
at least one processor coupled to the wireless transceiver and the at least one memory, wherein the at least one processor is configured to:
receive from a serving base station, via the wireless transceiver, a conditional reconfiguration information comprising a list of at least one candidate target base station and associated resources for handover;
receive, via the wireless transceiver, assistance data for positioning measurements;
identify frequency resources associated with candidate target base stations that will degrade the positioning measurements, wherein the at least one processor is configured to identify the frequency resources associated with the candidate target base stations that will degrade the positioning measurements by being configured to identify frequency bands that cause self-interference or that cause de-sense of satellite positioning system measurements or the frequency resources to be measured;
select a candidate target base station that will minimize degradation of the positioning measurements as a target base station for the handover;
perform, via the wireless transceiver, the handover to the target base station; and
perform, via the wireless transceiver, the positioning measurements based on the assistance data.

17. A user equipment (UE) in a wireless network configured for supporting positioning of the UE, the UE comprising:
a wireless transceiver configured to wirelessly communicate with entities in the wireless network;
at least one memory;
at least one processor coupled to the wireless transceiver and the at least one memory, wherein the at least one processor is configured to:
receive from a serving base station, via the wireless transceiver, a conditional reconfiguration information comprising a list of at least one candidate target base station and associated resources for handover;
receive, via the wireless transceiver, assistance data for positioning measurements;
estimate a throughput degradation due to the positioning measurements using the serving base station;

determine a target base station for the handover if the throughput degradation is greater than a predetermined threshold by selecting a candidate target base station that provides a higher net throughput relative to other candidate target base stations;

perform, via the wireless transceiver, the handover to the target base station; and perform, via the wireless transceiver, the positioning measurements based on the assistance data.

18. The UE of claim 17, wherein the higher net throughput is determined based on a bandwidth of the candidate target base station relative to the other candidate target base stations.

19. The UE of claim 17, wherein the higher net throughput is determined based on a number of Multiple Input Multiple Output (MIMO) layers of the candidate target base station relative to the other candidate target base stations.

20. A user equipment (UE) in a wireless network configured for supporting positioning of the UE, the UE comprising:

a wireless transceiver configured to wirelessly communicate with entities in the wireless network;

at least one memory;

at least one processor coupled to the wireless transceiver and the at least one memory, wherein the at least one processor is configured to:

receive from a serving base station, via the wireless transceiver, a conditional reconfiguration information comprising a list of at least one candidate target base station and associated resources for handover;

receive, via the wireless transceiver, assistance data for positioning measurements, wherein the positioning measurements are related to timing advance (TA);

select a candidate target base station with a higher associated sub-carrier spacing than other candidate target base stations as a target base station for the handover;

perform, via the wireless transceiver, the handover to the target base station; and perform, via the wireless transceiver, the positioning measurements based on the assistance data.

21. The UE of claim 20, wherein the positioning measurements related to the TA correspond to Enhanced Cell ID positioning measurements.

22. The UE of claim 20, wherein multiple candidate target base stations have the higher associated sub-carrier spacing, and wherein the at least one processor is configured to select the candidate target base station with the higher associated sub-carrier spacing than the other candidate target base stations by being configured to select the candidate target base station with a more frequent TA than the other candidate target base stations.

* * * * *